United States Patent
Dou et al.

(10) Patent No.: US 9,783,661 B2
(45) Date of Patent: Oct. 10, 2017

(54) BLEND OF BIMODAL POLYETHYLENE WITH UNIMODAL ULTRA HIGH MOLECULAR WEIGHT POLYETHYLENE WITH IMPROVED MECHANICAL PROPERTIES

(71) Applicant: Borealis AG, Vienna (AT)

(72) Inventors: Qizheng Dou, Linz (AT); Alexandra Romina Albunia, Linz (AT); Yi Liu, Engerwitzdorf (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/912,571

(22) PCT Filed: Feb. 6, 2015

(86) PCT No.: PCT/EP2015/052479
§ 371 (c)(1),
(2) Date: Feb. 17, 2016

(87) PCT Pub. No.: WO2015/122161
PCT Pub. Date: Aug. 20, 2015

(65) Prior Publication Data
US 2016/0347939 A1    Dec. 1, 2016

(30) Foreign Application Priority Data
Feb. 13, 2014  (EP) .................... 14154935

(51) Int. Cl.
*C08L 23/06* (2006.01)
*C08L 23/04* (2006.01)
*C08J 3/00* (2006.01)

(52) U.S. Cl.
CPC .............. *C08L 23/06* (2013.01); *C08J 3/005* (2013.01); *C08L 23/04* (2013.01); *C08J 2323/06* (2013.01); *C08J 2423/06* (2013.01); *C08J 2423/08* (2013.01); *C08L 2203/18* (2013.01); *C08L 2205/02* (2013.01); *C08L 2205/025* (2013.01); *C08L 2207/068* (2013.01)

(58) Field of Classification Search
CPC ................................ C08L 23/04–23/08; C08L 2205/02–2205/025; C08L 2207/068
See application file for complete search history.

(56) References Cited

U.S. PATENT DOCUMENTS

| | | | |
|---|---|---|---|
| 3,324,093 A | 6/1967 | Alleman | |
| 3,405,109 A | 9/1968 | Rohlfing | |
| 4,582,816 A | 4/1986 | Miro | |
| 5,391,654 A | 2/1995 | Ahvenainen et al. | |
| 2009/0105422 A1* | 4/2009 | Berthold | C08F 10/00 525/240 |
| 2015/0225555 A1* | 8/2015 | Mather | C08L 23/06 525/240 |

FOREIGN PATENT DOCUMENTS

| | | |
|---|---|---|
| EP | 0 479 186 A2 | 4/1992 |
| EP | 0 517 868 B1 | 11/1995 |
| EP | 0 688 794 A1 | 12/1995 |
| EP | 0 810 235 A2 | 12/1997 |
| EP | 1 201 711 A1 | 5/2002 |
| EP | 1 985 660 B2 | 10/2008 |
| EP | 2 743 305 A1 | 6/2014 |
| WO | WO 94/28064 | 12/1994 |
| WO | WO 96/18677 | 6/1996 |
| WO | WO 99/51646 | 10/1996 |
| WO | WO 01/55230 A1 | 8/2001 |
| WO | WO 03/106510 A1 | 12/2003 |
| WO | WO 2005/118655 A1 | 2/2005 |
| WO | WO 2006/092378 A1 | 9/2006 |
| WO | WO 2007/042216 A1 | 4/2007 |
| WO | WO 2013/060736 A1 | 5/2013 |
| WO | WO 2014095917 A1 * | 6/2014 ............. C08L 23/10 |

OTHER PUBLICATIONS

Dielectric corporation (UHMW general material properties, 2012).*
Ticona (GUR PE-UHMW, 1998).*
Busico et al.; Alk-1-ene Polymerization in the Presence of a Monocyclopentadienyl Zirconium(IV) Acetamidinate Catalyst: Microstructural and Mechanistic Insights; 28; 1128-1134; 2007.
Castignolles et al.; Detection and quantification of branching in polyacrylates by size-exclusion chromatography (SEC) and melt-state 13C NMR spectroscopy; Polymer; 50; 2373-2383; 2009.
Filip et al.; Heteronuclear decoupling under fast MAS by a rotor-synchronized Hahn-echo pulse train; Journal of Magnetic Resonance; 176; 239-243; 2005.
Griffin et al.; Low-load rotor-synchronised Hahn-echo pulse train (RS-HEPT) 1H decoupling in solid-state NMR: factors affecting MAS spin-echo dephasing times; Mag. Reson. Chem.; 45; S198-S208; 2007.
Heino et al.; Rheological Characterization of Polyethylene Fractions; Theoretical and Applied Rheology; vol. 1; 360-362; 1992.
Heino et al.; The Influence of Molecular Structure on Some Rheological Properties of Polyethylene; Annual Transactions of the Nordic Rheology Society; 1995.
Kaye et al.; Definition of Terms Relating to the Non-Ultimate Mechanical Properties of Polymers; Pure and Applied Chemistry; vol. 70; No. 3; 701-754; 1998.
Klimke et al.; Optimisation and Application of Polyolefin Branch Quantification by Melt-State 13C NMR Spectroscopy; Macromolecular Chemistry and Physics; 207; 382-295; 2006.

(Continued)

*Primary Examiner* — Wenwen Cai
(74) *Attorney, Agent, or Firm* — Richard M. Klein; Fay Sharpe LLP

(57) ABSTRACT

High density polyethylene blend, comprising (A) 55 to 99 wt % of a high density multimodal polyethylene component having a density of at least 930 kg/m3, and (B) 1 to 45 wt % of an ultra-high molecular weight polyethylene homo- or copolymer component having (i) an intrinsic viscosity of at least 15.0 dl/g (ii) an a nominal viscosity molecular weight (Mv) of at least $2.0*10^6$ g/mol and (iii) a molecular weight of ($M_w$) of at least $0.7*10^6$ g/mol, and wherein said blend has an $MFR_{21}$ of 0.05 to 10.0 g/10 min and a density of at least 925 kg/m³.

13 Claims, No Drawings

(56) References Cited

OTHER PUBLICATIONS

Lippits et al.; Formation of Entanglements in Initially Disentangled Polymer Melts; Macromolecules; 39; 8882-8885; 2006.
Pandey et al.; Heterogeneity in the Distribution of Entanglement Density during Polymerization in Disentangled Ultrahigh Molecular Weight Polyethylene; Macromolecules; 44; 4952-4960; 2011.
Parkinson et al.; Effect of Branch Length on 13C NMR Relaxation Properties in Molten Poly[ethylene-co-($\alpha$-olefin)] Model Systems; Macromolecular Chemistry and Physics; 208; 2128-2133; 2007.
Pollard et al.; Observation of Chain Branching in Polyethylene in the Solid State and Melt via 13C NMR Spectroscopy and Mel NMR Relaxation Time Measurements; Macromolecules; 37; 813-825; 2004.
Randall et al.; A Review of High Resolution Liquid 13Carbon Nuclear Magnetic Resonance Characterizations of Ethylene-Based Polymers; Journal of Macromolecular Science, Part C: Polymer Reviews; vol. 29; No. 2-3; 1989.
Zhou et al.; A new decouplg method for accurate quantification of polyethylene copolymer composition and triad sequence distribution with 13C NMR; Journal of Magnetric Resonance; 187; 225-233; 2007.
International Search Report and Written Opinion of PCT Application No. PCT/EP2015/052479 dated Apr. 20, 2015.

* cited by examiner

BLEND OF BIMODAL POLYETHYLENE WITH UNIMODAL ULTRA HIGH MOLECULAR WEIGHT POLYETHYLENE WITH IMPROVED MECHANICAL PROPERTIES

The present invention is related to a blend of a bimodal polyethylene and a unimodal ultra high molecular weight polyethylene. In particular, the invention is related to a multimodal polyethylene composition comprising a high density bimodal polyethylene component and an ultra high molecular weight polyethylene (UHMWPE) homo- or copolymer component, the composition showing improved mechanical properties.

The invention also covers articles, preferably pipes, made from the multimodal polyethylene composition.

Multimodal polyethylene polymers are well known in the art. A multimodal polyethylene system typically comprises a high molecular weight (HMW) and a low molecular weight (LMW) component.

The HMW component provides good mechanical properties to the system, whilst the LMW component provides good processability. Multimodal polyethylene systems have a wide range of useful practical applications, such as in the production of blow moulded articles, films or pipes.

In respect to improved mechanical properties, it is desired to increase the molecular weight of the HMW component, e.g. by introduction of an ultra high molecular weight (UHMW) fraction leading to a trimodal system.

However, it is also well-known that UHMWPE is so intractable that, at low loadings, it forms separate islands in HDPE matrix and therefore leads to inhomogeneity in the final blend.

When harsh compounding conditions or re-extrusions are implemented to improve homogeneity, however, degradation of the polymer occurs, reducing also the positive contribution of the HMW tail to properties.

The incorporation of UHMW polyethylene into a polyethylene composition as a copolymer is reported in, for example, WO 2007/042216, which describes a composition for injection moulding comprising a UHMWPE copolymer.

Also WO 96/18677 and WO 2006/092378 describe the addition of a UHMWPE copolymer to a bimodal polyethylene.

In WO94/28064, polyethylene compositions are reported comprising a UHMW component and a unimodal HDPE component.

WO 2013/060736 describes a high density polyethylene blend of a high density multimodal polyethylene component and an UHMWPE homopolymer having an intrinsic viscosity of at least 6 dl/g up to 20 dl/g and a nominal viscosity molecular weight (Mv) of at least 800,000 g/mol up to 2,000,000 g/mol. It is reported that such blends are homogeneous and possess excellent impact strength and strain at break without losses of tensile modulus.

Although a lot of work has already been done in this field, there is still the requirement for further improved materials showing still improved properties compared to the state of the art materials, e.g. there is still the need to maximise the advantage gained by including an UHMWPE into a bimodal polyethylene.

It is thus an object of the present invention to provide a novel multimodal polyethylene blend which has improved mechanical properties and processability.

Specifically, it is desired to produce a blend of an UHMW polyethylene into a multimodal high density polyethylene matrix at commercially relevant loadings, allowing advantage to be taken of the resulting enhanced mechanical properties.

The present inventors have found that the combination of a particular high density multimodal polyethylene polymer with a particular homo- or copolymer ultra-high molecular weight component can result in a blend which provides the necessary properties. These components can surprisingly be blended together to give blends of excellent mechanical properties despite the very high molecular weights involved. The blends possess excellent tensile strength, strain at tensile strength, stress at break and strain at break without losses of tensile modulus, making them furthermore ideal for pipe formation.

SUMMARY OF INVENTION

Thus viewed from a first aspect the invention provides a high density polyethylene blend, comprising
(A) 55 to 99 wt % of a high density multimodal polyethylene component having a density of at least 930 kg/m3, and
(B) 1 to 45 wt % of an ultra-high molecular weight polyethylene homo- or copolymer component having
(i) an intrinsic viscosity of at least 15.0 dl/g
(ii) a nominal viscosity molecular weight (Mv) of at least $2.0*10^6$ g/mol and
(iii) a molecular weight of ($M_w$) of at least $0.7*10^6$ g/mol, and wherein said blend has an $MFR_{21}$ of 0.05 to 10.0 g/10 min and a density of at least 925 kg/m$^3$.

In a preferred embodiment the ultra-high molecular weight component (B) is a disentangled ultra-high molecular weight polyethylene, which is further characterized by a factor for the normalized elastic modulus $G'_0/G'_p$ in the range of 0.20 to 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus.

The homogeneous polymer blends of the current invention are well suited for use in pipes for various purposes, such as fluid transport, e.g. transport of liquids or gases such as water or natural gas is known. It is common for the fluid to be pressurised in these pipes.

Thus viewed from a further aspect, the invention provides an article, preferably a pipe, comprising the polymer blend as hereinbefore described.

Viewed from another aspect the invention provides a process for the preparation of a blend as hereinbefore defined comprising mixing
(A) 55 to 99 wt % of a high density multimodal polyethylene component having a density of at least 930 kg/m3, and
(B) 1 to 45 wt % of an ultra-high molecular weight polyethylene homo- or copolymer having a an intrinsic viscosity of at least 15.0 dl/g, an a nominal viscosity molecular weight (Mv) of at least $2.0*10^6$ g/mol and a molecular weight of ($M_w$) of at least $0.7*10^6$ g/mol; and extruding or kneading the same so as to form a blend having an $MFR_{21}$ of 0.05 to 10.0 g/10 min and a density of at least 925 kg/m$^3$.

Preferably the ultra-high molecular weight component (B) is a disentangled ultra-high molecular weight polyethylene, which is further characterized by a factor for the normalized elastic modulus $G'_0/G'_p$ in the range of 0.20 to 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus.

Viewed from another aspect the invention provides the use of the blend as herein before defined in the manufacture of an article, especially a pipe.

DETAILED DESCRIPTION OF INVENTION

The tests for any claimed parameter are given in the "analytical tests" section of the text which precedes the examples.

Wherever the term "molecular weight Mw" is used herein, the weight average molecular weight is meant. Wherever the term "molecular weight Mv" is used herein, the nominal viscosity molecular weight is meant.

The polyethylene blend of the invention comprises at least two components:
(A) a high density multimodal polyethylene component, and
(B) an ultra-high molecular weight polyethylene homo- or copolymer component. Taken together these form the polyethylene blend of the invention. In all embodiments, the blend is an HDPE, i.e. one having a density of at least 925 kg/m$^3$.

Blend Properties

The properties of the blend are reported below. The parameters which follow may be measured in the presence of standard additives that are inherently present in commercial polymers which may be used to manufacture the blends of the invention.

The polyethylene blend of the invention has a density according to ISO 1183 at 23° C. of at least 925 kg/m$^3$, preferably of at least 930 kg/m$^3$, more preferably of at least 935 kg/m$^3$. The upper limit for density may be 975 kg/m$^3$, preferably 970 kg/m$^3$.

The MFR$_{21}$ according to ISO 1133 of the polyethylene blend of the invention is in the range of 0.05 to 10 g/10 min, preferably 0.1 to 8 g/10 min, especially 0.2 to 5 g/10 min.

The polyethylene blend preferably has an MFR$_5$ of less than 1.0 g/10 min, preferably less than 0.5 g/10 min.

The tensile modulus of the blends of the invention is preferably higher than 90% of the value of component (A) on its own, especially higher than 95%.

The tensile modulus of the blends of the invention may therefore be at least 1000 MPa, such as at least 1050 MPa, preferably at least 1100 MPa.

The tensile strength of the blends of the invention is greater than the tensile strength of component (A) on its own, i.e. at least 15% more, preferably at least 20% more and even more preferred at least 23% more.

The stress at break of the blends of the invention is greater than the stress at break of component (A) on its own, i.e. at least 40% more, preferably at least 50% more and even more preferred at least 60% more.

The strain at break of the blends of the invention is preferably greater than the strain at break of component (A) on its own, i.e. at least 10% more, preferably at least 15% more and even more preferred at least 20% more.

High Density Multimodal Polyethylene Component

The blend of the invention includes a high density multimodal polyethylene component, i.e. one having a density of at least 930 kg/m$^3$. The term "multimodal" means herein, unless otherwise stated, multimodality with respect to molecular weight distribution and includes therefore a bimodal polymer. Usually, a polyethylene composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

Component (A) of the blend of the invention is a high density multimodal polyethylene and is preferably present in an amount of 55 to 99 wt %, preferably 65 to 95 wt %, more preferably 80 to 93 wt % of the blend.

The multimodal polyethylene component (A) of the invention has a density according to ISO 1183 at 23° C. of at least 930 kg/m$^3$, preferably of at least 935 kg/m$^3$ and more preferably of at least 940 kg/m$^3$. The upper limit for density may be 980 kg/m$^3$, preferably 975 kg/m$^3$, and more preferably 970 kg/m$^3$. A highly preferred density range is 945 to 965 kg/m$^3$.

The MFR$_{21}$ according to ISO 1133 of the multimodal polyethylene of the invention is preferably in the range of 1 to 20 g/10 min, preferably 2 to 15 g/10 min.

Preferably the multimodal polyethylene component (A) has an MFR$_{21}$ of 3 to 14 g/10 min.

The MFR$_5$ according to ISO 1133 of the multimodal polyethylene component (A) of the invention is preferably less than 1.0 g/10 min.

Component (A) preferably has an Mw of at least 70,000 g/mol, more preferably at least 120,000 g/mol. The Mw of the Component (A) should be less than 400,000 g/mol, preferably less than 300,000 g/mol.

The Mw/Mn of component (A) may be at least 4, such as at least 10, such as 10 to 30.

In all embodiments of the invention, it is preferable if component (A) is a multimodal polyethylene comprising at least (i) a lower weight average molecular weight (LMW) ethylene homopolymer or copolymer component, and (ii) a higher weight average molecular weight (HMW) ethylene homopolymer or copolymer component. Preferably, at least one of said LMW and HMW components is a copolymer of ethylene with at least one comonomer. It is preferred that at least said HMW component is an ethylene copolymer. Alternatively, if one of said components is a homopolymer, then said LMW is the preferably the homopolymer.

More preferably component (A) comprises one ethylene homopolymer component and one butane—or hexane copolymer component.

Said LMW component of multimodal polymer preferably has a MFR$_2$ of at least 5 g/10 min, preferably at least 50 g/10 min, more preferably at least 100 g/10 min.

The density of LMW component of said multimodal polymer may range from 940 to 980 kg/m$^3$, e.g. 950 to 975 kg/m$^3$.

The LMW component of said multimodal polymer may form from 30 to 70 wt %, e.g. 40 to 60% by weight of the multimodal polymer with the HMW component forming 70 to 30 wt %, e.g. 60 to 40% by weight. In one embodiment said LMW component forms 50 wt % or more of the multimodal polymer as defined above or below. Typically, the LMW component forms 45 to 55% and the HMW component forms 55 to 45% of the blend.

The HMW component of said multimodal ethylene polymer has a lower $MFR_2$ than the LMW component.

The multimodal ethylene polymer of the invention may be an ethylene homopolymer or copolymer. By ethylene homopolymer is meant a polymer which is formed essentially only ethylene monomer units, i.e. is 99.9 wt % ethylene or more. It will be appreciated that minor traces of other monomers may be present due to industrial ethylene containing trace amounts of other monomers.

The multimodal ethylene polymer of the invention may also be a copolymer and can therefore be formed from ethylene with at least one other comonomer, e.g. $C_3$-$C_{20}$ olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred.

The multimodal ethylene polymer of the invention can comprise one monomer or two monomers or more than 2 monomers. The use of a single comonomer is preferred. If two comonomers are used it is preferred if one is a C3-8 alpha-olefin and the other is a diene as hereinbefore defined.

The amount of comonomer is preferably such that it comprises 0-3 mol %, more preferably 0.1-2.0 mol % and most preferably 0.1-1.5 mol % of the ethylene polymer. Values below 1.0 mol % are also envisaged, e.g. 0.1 to 1.0 mol %. These can be determined by NMR.

It is preferred however if the ethylene polymer of the invention comprises a LMW homopolymer component and a HMW ethylene copolymer component, e.g. an ethylene-hexene copolymer or an ethylene-butene copolymer.

For the preparation of the multimodal ethylene polymer of the present invention polymerization methods well known to the skilled person may be used. It is within the scope of the invention for a multimodal, e.g. at least bimodal, polymers to be produced by blending each of the components in-situ during the polymerization process thereof (so called in-situ process) or, alternatively, by blending mechanically two or more separately produced components in a manner known in the art.

Polyethylenes useful in the present invention are preferably obtained by in-situ blending in a multistage polymerization process. Accordingly, polymers are obtained by in-situ blending in a multistage, i.e. two or more stage, polymerization process including solution, slurry and gas phase process, in any order. Whilst it is possible to use different single site catalysts in each stage of the process, it is preferred if the catalyst employed is the same in both stages.

Ideally therefore, the polyethylene polymer used in the blend of the invention is produced in at least two-stage polymerization using a single site catalyst or Ziegler Natta catalyst. Thus, for example two slurry reactors or two gas phase reactors, or any combinations thereof, in any order can be employed. Preferably however, the polyethylene is made using a slurry polymerization in a loop reactor followed by a gas phase polymerization in a gas phase reactor.

A loop reactor—gas phase reactor system is well known as *Borealis* technology, i.e. as a BORSTAR™ reactor system. Such a multistage process is disclosed e.g. in EP517868.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerization may also be carried out in bulk where the reaction medium is formed from the monomer being polymerized.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer, e.g. ethylene.

The ethylene concentration in the first, preferably loop, reactor may be around 5 to 15 mol %, e.g. 7.5 to 12 mol %. In the second, preferably gas phase, reactor, ethylene concentration is preferably much higher, e.g. at least 40 mol % such as 45 to 65 mol %, preferably 50 to 60 mol %.

Preferably, the first polymer fraction is produced in a continuously operating loop reactor where ethylene is polymerized in the presence of a polymerization catalyst as stated above and a chain transfer agent such as hydrogen. The diluent is typically an inert aliphatic hydrocarbon, preferably isobutane or propane. The reaction product is then transferred, preferably to continuously operating gas phase reactor. The second component can then be formed in a gas phase reactor using preferably the same catalyst.

The multimodal polyethylenes of the invention are commercial products and can be purchased from various suppliers.

UHMW Component

The blend of the invention further comprises as component (B) an UHMW polyethylene homo- or copolymer component in an amount of 1 to 45 wt %. Preferably, this UHMWPE component comprises 5 to 35 wt % and even more preferably 7 to 20 wt % of the blend.

The UHMW polyethylene component of the blends of the invention preferably has a nominal viscosity molecular weight (Mv) of at least 2,000,000 g/mol up to 6,000,000 g/mol, preferably at least 2,200,000 g/mol up to 5,800,000 g/mol and more preferably of at least 2,500,000 g/mol up to 5,500,000 g/mol.

The complex viscosity, which is an indirect measure of the molecular weight, at a shear stress of 0.05 rad/s at 190° C. ($\eta^*_{0.05}$ rad/s) of the UHMW component is in a range of 1,000,000 Pa·s up to 30,000,000 Pa·s, preferably in the range of 2,000,000 Pa·s up to 28,000,000 Pa·s and more preferably in the range of 3,000,000 Pa·s up to 25,000,000 Pa·s.

The intrinsic viscosity of the UHMW component is at least 15 dl/g, preferably at least 17 dl/g up to 40 dl/g, preferably up to 30 dl/g.

This component has a very low MFR, such as an $MFR_{21}$ of less than 0.5 g/10 min, especially $MFR_{21}$ of less than 0.1 g/10 min, more especially less than 0.05 g/10 min.

The molecular weight ($M_w$) of the UHMW component is at least 70,000 g/mol up to 3,000,000 g/mol, preferably at least 90,000 up to 2,800,000 g/mol and more preferably 1,100,000 g/mol up to 2,500,000 g/mol.

The UHMW polyethylene of the invention is either an ethylene homopolymer or an ethylene copolymer.

In an UHMW polyethylene copolymer, the comonomer present in this component is at least one $C_{3-20}$ olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred. Ideally only one comonomer is present. The use of hexene is especially preferred.

The comonomer content is preferably up to 2.0 mol %, more preferably up to 1.0 mol %. The amount of comonomer is generally tailored so as to achieve the intrinsic viscosity as required in the invention.

Preferably UHMWPE homopolymers are used in the present invention.

The UHMW component is furthermore preferably unimodal. This means that in has a single peak on GPC. Ideally it is formed from a single component and is therefore produced in a single manufacturing step.

Additionally the UHMW polyethylene component used according to the invention is in a preferred embodiment a disentangled UHMW polyethylene.

The disentanglement of the UHMW polyethylene component is expressed by a factor for the normalized elastic modulus $G'_0/G'_p$ in the range of 0.20 to 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus.

Preferably the factor $G'_0/G'_p$ is in the range of 0.30 to 0.94, more preferably in the range of 0.40 to 0.93 and most preferably in the range of 0.50 to 0.92.

The change in the modulus is followed as a function of time and it is assumed that the plateau region is reached for fully entangled material, as described e.g. by D. Lippits et al. in Macromolecules 2006, 39, 8882-8885 or by A. Pandey et al. in Macromolecules, 2011, 44, 4952-4960.

The time sweep measurement method used for determination of $G'_0$ and $G'_p$ is described in detail in the experimental part.

The UHMW polyethylene used according to the invention is prepared by a process using Ziegler-Natta-catalysts.

Suitable Ziegler—Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica or $MgCl_2$.

The average particle size (D50) of the silica support can be typically from 10 to 100 μm. However, it has turned out that special advantages can be obtained if the support has an average particle size (D50) from 5 to 20 μm, preferably from 5 to 15 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler—Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of *Borealis.*

The Ziegler—Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used and alkyl aluminium halides of which ethylaluminium dichloride and diethylaluminium chloride are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

The polymerization may be conducted in slurry or gas phase, preferably in slurry.

The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is from 30 to 100° C., preferably from 35 to 95° C. and in particular from 40 to 90° C.

The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

Hydrogen may be fed into the reactor to control the molecular weight of the polymer as known in the art. Furthermore, one or more alpha-olefin comonomers may be added into the reactor to control the density and molecular weight of the polymer product. The actual amount of such hydrogen and comonomer feeds depends on the catalyst that is used and the desired melt index (or molecular weight) and density (or comonomer content) of the resulting polymer.

For preparing UHMPE being suitable for the present invention it is preferred to add no hydrogen.

Preparation of Blend

The blends of the invention may be prepared simply by mixing the components but to ensure homogeneity, it will be appreciated that the components have to be compounded. This can be achieved by any conventional method known to those skilled in the art, e.g. extrusion or kneading.

Where extrusion is used to prepare the blends of the invention, a second extrusion step may optionally be employed, e.g. under the same conditions as the first. It has been found that the use of two extrusion steps can improve homogeneity. The strain at break and possibly also sagging properties can thus be improved.

The use of extrusion to homogenise the compositions is preferred, in particular the use of a co-rotating twin extruder, such as ZSK 18 or ZSK 40.

It will be appreciated that prior to forming the blend of the invention, the two polymer components of the invention may be blended with standard additives and adjuvants known in the art. It may also contain additional polymers, such as carrier polymers of the additive masterbatches. The properties of the components of the blend and the blend itself can be measured in the absence of or in the presence of any additives. It will be preferred if any additives are present however when properties are determined.

In addition to the base resin, the polymer composition may comprise and preferably comprises usual additives for utilization with polyolefins, such as pigments (e.g. carbon black), stabilizers (e.g. antioxidant agents), metal scavengers and/or UV-stabilizers, antistatic agents and utilization agents (such as processing aid agents). Preferably, the amount of these additives is 10 wt % or below, more preferably 8 wt % or below, more preferably 5 wt % or below, of the composition (100 wt %).

Further preferred, the amount of additives different from carbon black is 0 wt % to 1 wt %, more preferably 0.001 wt % to 0.8 wt %.

The polyethylene composition comprises carbon black in an amount of 1.0 to 10 wt %, preferably 1.5 to 9.0 wt %, more preferably 1.8 to 8.0 wt %, still more preferably 1.8 to 7.0 wt %, still more preferably 1.8 to 5.0 wt %, still more preferably 1.8 to 4.5 wt % and most preferably 1.8 to 4.0 wt %, based on the total amount of the composition.

Carbon black can be added to polymer composition as such (neat) or in form of so-called master batch (CBMB), in which carbon black, and optionally further additives as defined above, are contained in concentrated form in a carrier polymer.

Components (A) and (B) in the polymer blend of the invention can be further blended with any other polymer of interest or used on its own as the only olefinic material in an article. Thus, the ethylene polymer of the invention can be blended with known HDPE, MDPE, LDPE, LLDPE polymers. Ideally however any article made from the ethylene polymer blend is the invention consists essentially of the polymer blend, i.e. contains the multimodal polyethylene component and the UHMWPE component.

Applications

The blends of the invention can be used to make all manner of articles such as cable sheathings, fibres, films and moulded articles. They are of primary interest in the formation of pipes. Pipes can be manufactured using various techniques such as RAM extrusion or screw extrusion.

It will be appreciated that the preferred features of the polymers of the invention as described herein can all be combined with each other in any way.

The invention will now be described with reference to the following non limiting examples.

Experimental Part

Analytical Tests

Melt Flow Rate

The melt flow rate (MFR) is determined according to ISO 1133 and is indicated in g/10 min. The MFR is an indication of the melt viscosity of the polymer. The MFR is determined at 190° C. for polyethylene. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Density

Density of the polymer was measured according to ISO 1183-1:2004 Method A on compression moulded specimen prepared according to EN ISO 1872-2 (February 2007) and is given in $kg/m^3$.

Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]) and the RSHEPT decoupling scheme {[4], [5]}. A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (6+) at 30.00 ppm {[9]}.

Characteristic signals corresponding to the incorporation of 1-hexene were observed {[9]} and all contents calculated with respect to all other monomers present in the polymer.

$$H = I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.84 and 32.23 ppm assigned to the 2s and 3s sites respectively:

$$S = (1/2)*(I_{2S} + I_{3S})$$

The relative content of ethylene was quantified using the integral of the bulk methylene (δ+) signals at 30.00 ppm:

$$E = (1/2)*I_{\delta+}$$

The total ethylene comonomer content was calculated based on the bulk methylene signals and accounting for ethylene units present in other observed comonomer sequences or end-groups:

$$E_{total} = E + (5/2)*B + (3/2)*S$$

The total mole fraction of 1-hexene in the polymer was then calculated as:

$$fH = (H_{total}/(E_{total} + H_{total}))$$

The total comonomer incorporation of 1-hexene in mole percent was calculated from the mole fraction in the usual manner:

$$H[\text{mol-}\%] = 100*fH$$

The total comonomer incorporation of 1-hexene in weight percent was calculated from the mole fraction in the standard manner:

$$H[\text{wt.-}\%] = 100*(fH*84.16)/((fH*84.16) + ((1-fH)*28.05))$$

REFERENCES

[1] Klimke, K., Parkinson, M., Piel, C., Kaminsky, W., Spiess, H. W., Wilhelm, M., Macromol. Chem. Phys. 2006; 207:382.
[2] Parkinson, M., Klimke, K., Spiess, H. W., Wilhelm, M., Macromol. Chem. Phys. 2007; 208:2128.
[3] Pollard, M., Klimke, K., Graf, R., Spiess, H. W., Wilhelm, M., Sperber, O., Piel, C., Kaminsky, W., Macromolecules 2004; 37:813.
[4] Filip, X., Tripon, C., Filip, C., J. Mag. Reson. 2005, 176, 239.
[5] Griffin, J. M., Tripon, C., Samoson, A., Filip, C., and Brown, S. P., Mag. Res. in Chem. 2007, 45, S1, S198.
[6] Castignolles, P., Graf, R., Parkinson, M., Wilhelm, M., Gaborieau, M., Polymer 50 (2009) 2373.
[7] Zhou, Z., Muemmerle, R., Qiu, X., Redwine, D., Cong, R., Taha, A., Baugh, D. Winniford, B., J. Mag. Reson. 2007, 187, 225.
[8] Busico, V., Carbonniere, P., Cipullo, R., Pellecchia, R., Severn, J., Talarico, G., Macromol. Rapid Commun. 2007, 28, 1128.
[9] J. Randall, Macromol. Sci., Rev. Macromol. Chem. Phys. 1989, C29, 201.

Molecular Weight

Mw, Mn and MWD are measured by Gel Permeation Chromatography (GPC) according to the following method:

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i / M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

$$K_{PP} = 19 \times 10^{-3} \text{ mL/g}, \alpha_{PP} = 0.725$$

A third order polynomial fit was used to fit the calibration data. All samples were prepared in the concentration range of 0.15-0.3 mg/ml for UHMW PE and in the range of 0.5-1 mg/ml for the blend and comparative Examples and dissolved at 160° C. for 3 hours under continuous gentle shaking.

Nominal viscosity molecular (Mv) is calculated from the intrinsic viscosity [η] according to ASTM D 4020-05

$$Mv = 5.37 \times 10^4 \times [\eta]^{1.37}$$

Intrinsic viscosity is measured according to DIN EN ISO 1628 (1998) in Decalin at 135° C.

The reduced viscosity (also known as viscosity number), $\eta_{red}$, and intrinsic viscosity, [η], of polyethylenes and polypropylenes are determined according to the ISO 1628-3:

"Determination of the viscosity of polymers in dilute solution using capillary viscometers".

Relative viscosities of a diluted polymer solution (~1 mg/ml) and of a pure solvent (decahydronaphthalene) are determined in an automated capillary viscometer (Lauda PVS1) equipped with 4 Ubbelohde capillaries placed in a thermostatic bath filled with silicone oil. The bath temperature is maintained at 135° C. Each measuring stand is equipped with electronics to control pump, valve function, time measurement, meniscus detection and has a magnetic stirrer. The sample is weighed out and directly placed into the capillary. The capillary is filled with the exact volume of solvent by use of an automatic pipette. The sample is dissolved with constant stirring until complete dissolution is achieved (typically within 60-90 min).

The efflux time of the polymer solution as well as of the pure solvent are measured several times until three consecutive readings do not differ for more than 0.1 s (standard deviation).

The relative viscosity of the polymer solution is determined as the ratio of averaged efflux times in seconds obtained for both, polymer solution and solvent:

$$\eta_{rel} = \frac{t_{solution} - t_{solvent}}{t_{solvent}} \text{ [dimensionless]}$$

Reduced viscosity ($\eta_{red}$) is calculated using the equation:

$$\eta_{red} = \frac{t_{solution} - t_{solvent}}{t_{solvent} * C} \text{ [dl/g]}$$

where C is the polymer solution concentration at 135° C.:

$$C = \frac{m}{V\gamma}.$$

and m is the polymer mass, V is the solvent volume, and $\gamma$ is the ratio of solvent densities at 20° C. and 135° C. ($\gamma = \rho_{20}/\rho_{135} = 1.107$).

The calculation of intrinsic viscosity [$\eta$] is performed using the Schulz-Blaschke equation from the single concentration measurement:

$$[\eta] = \frac{\eta_{red}}{1 + K * C * \eta_{red}}$$

where K is a coefficient depending on the polymer structure and concentration. For calculation of the approximate value for [$\eta$], K=0.27.

Complex Viscosity $\eta^*_{0.05}$

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm. Five measurement points per decade are made.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, $\eta$*, the dynamic shear viscosity, $\eta$', the out-of-phase component of the complex shear viscosity, $\eta$" and the loss tangent, tan $\eta$, which can be expressed as follows:

$$G' = \frac{\sigma_0}{\gamma_0}\cos\delta \text{[Pa]} \quad (3)$$

$$G'' = \frac{\sigma_0}{\gamma_0}\sin\delta \text{[Pa]} \quad (4)$$

$$G^* = G' + iG'' \text{[Pa]} \quad (5)$$

$$\eta^* = \eta' - i\eta'' \text{[Pa·s]} \quad (6)$$

$$\eta' = \frac{G''}{\omega} \text{[Pa·s]} \quad (7)$$

$$\eta'' = \frac{G'}{\omega} \text{[Pa·s]} \quad (8)$$

The values of storage modulus (G'), loss modulus (G"), complex modulus (G*) and complex viscosity ($\eta$*) were obtained as a function of frequency ($\omega$).

Thereby, e.g. $\eta^*_{0.05rad/s}$ (eta*$_{0.05rad/s}$) is used as abbreviation for the complex viscosity at the frequency of 0.05 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362.
[2] "The influence of molecular structure on some rheological properties of polyethylene", Heino, E. L., Borealis Polymers Oy, Porvoo, Finland, Annual Transactions of the Nordic Rheology Society, 1995.
[3] "Definition of terms relating to the non-ultimate mechanical properties of polymers", Pure & Appl. Chem., Vol. 70, No. 3, pp. 701-754, 1998.

Dynamic Time Sweep Experiment

Powders from bench scale reactor were stabilized with 0.25 wt % of IRGANOX B225. The stabilized powders were compression moulded at 200° C. for no more than 20 s into discs having diameter of 26 mm and thickness of ~1.8 mm. Time sweep measurements were carried out on a stress/strain controlled Anton Paar MCR501 rheometer with 25 mm diameter parallel plates under nitrogen (inert) atmosphere. The plates were conditioned at 180° C. for at least 30 minutes before inserting the compression moulded samples to ensure thermally stable environment. After a sample was inserted, the plates were closed with a positive normal force to ensure good contact. About 1 minute later, the plates were compressed till the gap is decreased to 1.7 to 2.1 mm. After another 1 minute the time sweep measurement was conducted at 180° C., with an angular frequency of 10 rad/s, a constant strain of 0.5% for at least 3600 s or longer.

The change in the modulus was plotted as a function of time as described in Macromolecules 2006, 39, 8882-8885. The starting G' is recorded as $G'_0$ while the ending G' is recorded as $G'_p$. $G'_0/G'_p$ is used to characterize the degree of entanglement. The lower value indicates higher degree of disentanglement. In some cases the modulus plateau does not appear within the test time frame and the real degree of entanglement in such cases is therefore higher than that evaluated by $G'_0/G'_p$.

Measure of Homogeneity/White Spot Rating (WSR)

The white spot rating of the compounded composition is determined according to ISO 18 553/2002-03-01 as follows:

Pellets of the composition which are obtained after a single compounding step are analysed by collecting 6 different pellets where from each pellet, one cut is used (thickness cut 20±2 μm). The cut for the measurement of the white spot rating should be taken near the middle of the pellet (sample) with rotation microtome Type Leica RM2265. Preferably, the cut is in flow direction of the melt through the whole of the pelletizer.

The cuts are evaluated at a magnification of 100× and the size and the number of the non-coloured inclusions ("whitespots"=non-pigmented, high molecular weight agglomerates/particles in the polymer) on the total area of each cut are determined. All white spots with a diameter of >5 μm are counted. Transmission light microscope Olympus BX41 with XYZ motorised stage from Marzhauser and particle inspector Software from Olympus was used.

The white spot rating test "homogeneity" is based on the ISO 18553/2002-03-01. In this test, inhomogeneities of the composition, present after a single compounding step as described above, which appear as white spots, are determined and rated according to the rating scheme given in ISO 18553/2002-03-01. The lower the composition is rated (less amount of high molecular weight particles) in this test, the better is the homogeneity of the composition.

Tensile Properties:

Tensile Modulus/Tensile Strength/Tensile Strain at Tensile Strength

Tensile tests are performed according to ISO 527-2:1993 at +23° C. on compression molded specimen The specimens (type 5A) were milled from plaques of 2 mm thickness prepared by compression moulding according to ISO 293:2004 using the conditions defined in chapter 3.3 of ISO 1872-2:2007

The modulus was measured at a speed of 1 mm/min.

For determining tensile strength (in MPa) the aforementioned tensile test according to ISO 527-2 at +23° C. was continued with an elongation rate of 50 mm/min until the specimen broke.

Stress at Yield:

Stress at yield (in MPa) was determined on the same samples according to ISO 527-2. The measurement was conducted at 23° C. temperature with an elongation rate of 50 mm/min.

Stress and Strain at Break:

Stress at break (in MPa) and Strain at break (in %) were determined on the same samples according to ISO 527-2. The measurement was conducted at 23° C. temperature with an elongation rate of 50 mm/min.

EXAMPLES

Catalyst (A) Preparation
Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, $TiCl_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst is: Al/Mg/Ti=1, 5/1,4/0,8 (mol/kg silica).

Catalyst (B)

As catalyst (B) Lynx 200 catalyst ($MgCl_2$-supported) supplied by BASF was used Polymerization of UHMWPE Used in Inventive Examples 1-7

Unimodal slurry copolymerization was carried out in a 5.3 L bench scale reactor and can be described as follows:

The reactor was operated with the SIEMENS SIMATIC BATCH process control system using WIN CC as process flow display software. All catalyst and co-catalyst components were stored in a glovebox. Special designed metal tubes with Swagelok quick connects have been used to inject the catalyst in the reactor.

Into the stirred 5.3 liter batch reactor maintained at a temperature of 23° C. 850 g propane diluent were introduced and triethylaluminium (TEA) as a cocatalyst was introduced so that the ratio of Al/Ti was 15 for catalyst (A) and 3.7 for catalyst (B).

For Examples IE6 and IE7 Diethyl aluminium chloride (DEAC) was used as cocatalyst with a ratio of Al/Ti of 15.

Then the temperature was raised to the actual polymerization temperature and catalyst was added.

The polymerization conditions are summarized in table 1

The polymerization was interrupted by venting the hydrocarbons from the reactor.

No hydrogen was added during polymerization.

TABLE 1

Polymerization parameters for producing UHMWPE

| IE | catalyst | Amount of Catalyst (mg) | T (° C.) | $C_2$ (bar) | $C_6/C_2$ cont feed (wt %) | Polymerization time (min) | Production rate (kg/h) |
|---|---|---|---|---|---|---|---|
| 1 | A | 37.8 | 60 | 5 | 0 | 116 | 0.25 |
| 2 | A | 37.8 | 70 | 5 | 0 | 71 | 0.38 |
| 3 | A | 37.6 | 40 | 4 | 0 | 120 | 0.06 |
| 4 | B | 363.2 | 50 | 6 | 0 | 35 | 0.61 |
| 5 | B | 364.2 | 40 | 6 | 0 | 48 | 0.40 |
| 6 | A | 75.0 | 60 | 6 | 2.5 | 40 | 0.12 |
| 7 | A | 75.0 | 40 | 6 | 5 | 193 | 0.02 |

IE . . . Inventive Example

The so prepared UHMWPE had the following properties as shown in Table 2:

| IE | IV (dl/g) | Mv (g/mol) | Mw (g/mol) | $\eta^*_{0.05}$ (Pa · s) | C6 (mol %) | $G'_0/G'_p$ |
|---|---|---|---|---|---|---|
| 1 | 17.8 | 2,700,000 | 1,430,000 | 11,000,000 | 0 | 0.79 |
| 2 | n.m. | n.m. | 1,180,000 | 5,600,000 | 0 | 0.92 |
| 3 | 24.4 | 4,280,000 | 2,120,000 | 22,700,000 | 0 | 0.65 |
| 4 | n.m. | n.m. | 1,920,000 | 7,700,000 | 0 | 0.87 |
| 5 | 29.0 | 5,400,000 | 2,110,000 | 11,800,000 | 0 | 0.79 |
| 6 | 17.5 | 2,720,000 | n.d | n.d | 0 | 0.87 |
| 7 | 22.2 | 3,760,000 | 1,696,000 | 20,789,000 | 0 | 0.75 | n.m. . . . not measurable
n.d. . . . not determined

In the Comparative Examples 1 to 3 UHMWPE homopolymers purchased from Jingchem Corporation were used. The properties can be seen in Table 3.

| CE | Density (kg/m³)* | Mv (g/mol)* | IV (dl/g)** | Mw (g/mol)** |
|---|---|---|---|---|
| 1 (GC001) | 934 | 1,150,000 | 8.4 | 571,000 |
| 2 (UHMW-PE2 of WO 2013/060736) | 934 | 880,000 | 7.7 | 384,000 |
| 3 (M2) | 933 | 2,900,000 | 15.2 | 761,000 |

*Mv was measured by ASTM 4020-81. Density was measured according to according to GB 1033. Both Mv and density are denoted in material info from the supplier.
**IV and Mw were measured at Borealis.

The UHMWPE used in CE1 and CE2 were the same as used in WO 2013/060736

As Component (A) a bimodal HDPE prepared as described in EP 1985660 B2; 2. Production of polymer compositions and pipes, Example was used.

Thus the bimodal HDPE was produced in a multistage reaction comprising a first (pre)polymerization stage in slurry in a 50 dm3 loop reactor, followed by transferring the slurry to a 500 dm3 loop reactor wherein polymerization was continued in slurry to produce the low molecular weight component, and a second polymerization in a gas phase reactor in the presence of the product from the second loop reactor to produce the comonomer containing high molecular weight component. As comonomer, hexene-1 has been used.

As a catalyst, a LYNX 200 available from BASF has been used. The so produced HDPE (Component (A)) had a density of 947 kg/m³

Preparation of Blends

Various blends of the two starting materials (83.88 wt % Component (A)+10 wt % Component (B)) with Irganox B225 (0.22 wt %) Ca-stearate (0.15 wt %) and 5.75 wt % of carbon black masterbatch, based on the final composition were prepared using extrusion Conventional extrusion conditions using a co-rotating twin screw extruder were employed. Extrusion was carried out at 230° C. and 120 rpm. Throughput rate was 0.5 kg/h. Samples were extruded only once.

For addition of carbon black a masterbatch containing 39.5 wt. % carbon black (Elftex TP, distributed by Cabot), 0.1 wt. % Irganox 1010 (from Ciba, now part of BASF) and 60.4 wt. % ethylene-butylene copolymer having a comonomer content of 1.7 wt. %, an $MFR_2$ (2.16 kg, 190° C., ISO 1133) of 30 g/10 min and a density of 959 kg/m³ in an amount of 5.75 wt % has been used.

The properties of the blends can be seen in Table 5 and 6.
Reference is 93.88 wt % of Component (A) with 6.12 wt % additive package as described above

TABLE 5

| Example | Density (kg/m³) | $MFR_5$ (g/10 min) | $MFR_{21}$ (g/10 min) | Mw (kg/mol) | PD | $\eta_{0.05}$ (Pa * s) |
|---|---|---|---|---|---|---|
| Reference | 960 | 0.27 | 10.18 | 209 | 26.6 | 166000 |
| IE 2 | 958 | 0.09 | 4.16 | 283 | 31.9 | 374000 |
| IE 3 | 958 | 0.04 | 2.35 | 330 | 36.7 | 550000 |
| IE 4 | 958 | 0.04 | 2.01 | 329 | 36.6 | 589900 |
| IE 5 | 958 | 0.04 | 1.80 | 326 | 36.1 | 595000 |
| CE 1* | 960 | 0.1 | 4.4 | 223 | 24.9 | 260900 |
| CE2 | n.d. | n.d. | n.d. | 271 | 30.3 | 235600 |
| CE 3 | n.d | 0.07 | 3.43 | 268 | 30.6 | 375000 |

TABLE 6

| Example | Tensile Modulus (MPa) | Relative Tensile Modulus* (%) | Tensile Strength (MPa) | Stress at break (%) | Strain at break (%) | Relative Strain at break (%) | WSR |
|---|---|---|---|---|---|---|---|
| Reference | 1161 | 100 | 26 | 19.2 | 333 | 100 | ~0 |
| IE 2 | 1161 | 100 | 39.4 | 39.3 | 485 | 145.6 | 7.67 |
| IE 3 | 1150 | 99.0 | 32.4 | 32.0 | 401 | 120.4 | 6.5 |
| IE 4 | 1123 | 96.7 | 37.6 | 37.5 | 445 | 133.8 | 4.5 |
| IE 5 | 1152 | 99.2 | 36.5 | 36.4 | 429 | 129.0 | 4.92 |
| CE 1* | 1102 | 94.9 | 27.9 | 25.4 | 516 | 154.9 | n.d |
| CE2 | 1188 | 102.3 | 26.9 | 23.9 | 357 | 112.6 | n.d. |
| CE 3 | 1163 | 100.2 | 28.0 | 22.8 | 383 | 115.0 | 5.8 |

Reference is 93.88 wt % of Component (A) with 6.12 wt % additive package CE1 was extruded twice; values taken from WO 2013/060736
Relative Tensile Modulus means relative to Reference; Reference is 100%
Relative Strain at break means relative to Reference; Reference is 100%
WSR is White spot rating
n.d. not determined.

The invention claimed is:

1. High density polyethylene blend, comprising:
(A) 55 to 99 wt % of a high density multimodal polyethylene component having a density of at least 930 kg/m³, and
(B) 1 to 45 wt % of an ultra-high molecular weight polyethylene homopolymer component having
(i) an intrinsic viscosity of at least 15.0 dl/g
(ii) a nominal viscosity molecular weight ($M_v$) of at least $2.0*10^6$ g/mol and
(iii) a molecular weight of ($M_w$) of at least $0.7*10^6$ g/mol, wherein component (B) is a disentangled ultra-high molecular weight polyethylene homopolymer, which is further characterized by a factor for the normalized elastic modulus $G'_0/G'_p$ in the range of 0.20 to 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus; and wherein said blend has an $MFR_{21}$ of 0.05 to 10.0 g/10 min and a density of at least 925 kg/m$^3$.

2. A blend as defined in claim 1, wherein component (A) is a bimodal HDPE having 0.1 to 2 mol % comonomer and an $MFR_{21}$ of 1-20 g/10 min.

3. A blend as defined in claim 1, wherein component (A) comprises an ethylene homopolymer component and a butene or hexene ethylene copolymer component.

4. A blend as defined in claim 1, wherein component (A) is present in an amount of 80 to 93 wt %.

5. A blend as claimed in claim 1, wherein the density of the blend is 935 to 970 kg/m$^3$.

6. A blend as claimed in claim 1, wherein the UHMW polyethylene homopolymer component has a complex viscosity $\eta^*_{0.05}$ at a shear stress of 0.05 rad/s at 190° C. in the range of 1,000,000 Pa·s to 30,000,000 Pa·s.

7. A blend as claimed in claim 1, wherein the UHMW polyethylene homopolymer is further characterized by the factor $G'_0/G'_p$ in the range of 0.30 to 0.94 in a dynamic time sweep measurement.

8. A blend as claimed in claim 1, wherein the UHMW polyethylene homopolymer component is an unimodal UHMW polyethylene.

9. A blend as claimed in claim 1, wherein the UHMW polyethylene homopolymer component is prepared in a slurry polymerization process at 30 to 100° C. by using a Ziegler-Natta catalyst.

10. A blend as claimed in claim 1, wherein the blend further comprises carbon black in an amount of 1.0 to 10 wt %, based on the total amount of the composition, whereby the carbon black is added in its original form or in the form of a master batch, in which carbon black, and optionally further additives are contained in concentrated form in a carrier polymer.

11. A process for the preparation of a blend as defined in claim 1 comprising mixing
(A) 55 to 99 wt % of a high density multimodal polyethylene component having a density of at least 930 kg/m$^3$, and
(B) 1 to 45 wt % of an ultra-high molecular weight polyethylene homopolymer having
(i) an intrinsic viscosity of at least 15.0 dl/g
(ii) a nominal viscosity molecular weight ($M_v$) of at least 2.0*10$^6$ g/mol and
(iii) a molecular weight of ($M_w$) of at least 0.7*10$^6$ g/mol, and extruding or kneading the same so as to form a blend having an $MFR_{21}$ of 0.05 to 10.0 g/10 min and a density of at least 925 kg/m$^3$;
wherein component (B) is a disentangled ultra-high molecular weight polyethylene homopolymer, which is further characterized by a factor for the normalized elastic modulus $G'_0/G'_p$ in the range of 0.20 to 0.95 determined in a dynamic time sweep measurement at 180° C. with constant strain of 0.5% at fixed frequency of 10 rad/s for at least 3600 s, whereby $G'_0$ is the elastic shear modulus measured at $t_0$ directly after melting the sample and $G'_p$ is the maximum plateau modulus.

12. An article made from the polyethylene blend as defined in claim 1.

13. Method for the production of an article comprising the use of the polyethylene blend according to claim 1.

* * * * *